Nov. 6, 1951  R. RAVOIRE  2,573,808
APPARATUS FOR TEACHING AND PRACTICING SKIING
Filed Aug. 12, 1948  2 SHEETS—SHEET 2
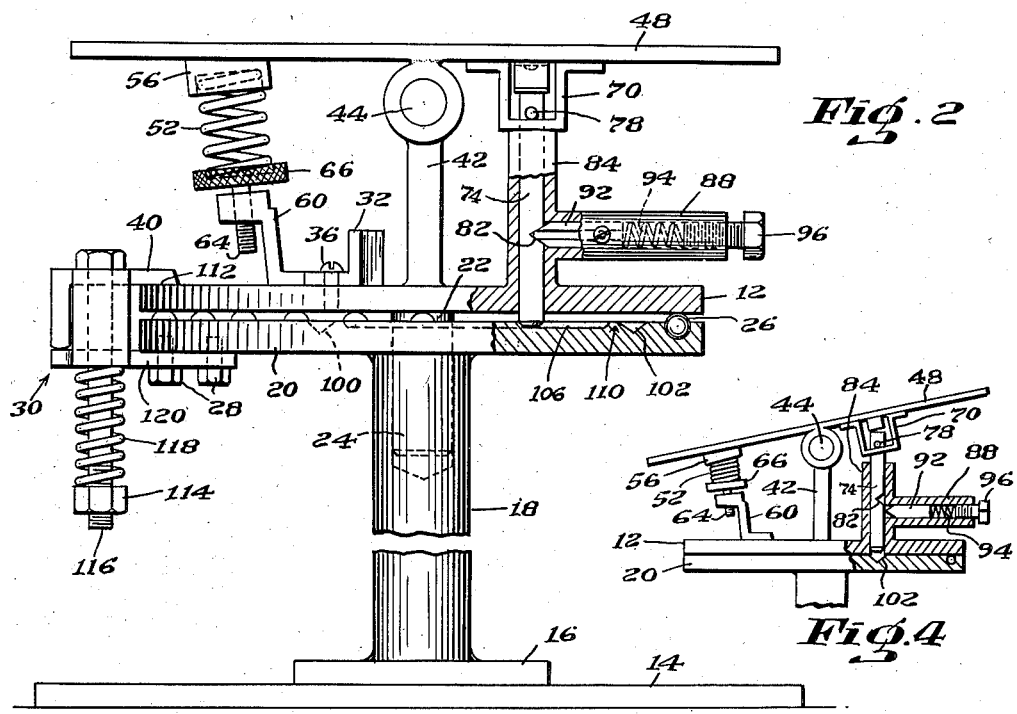
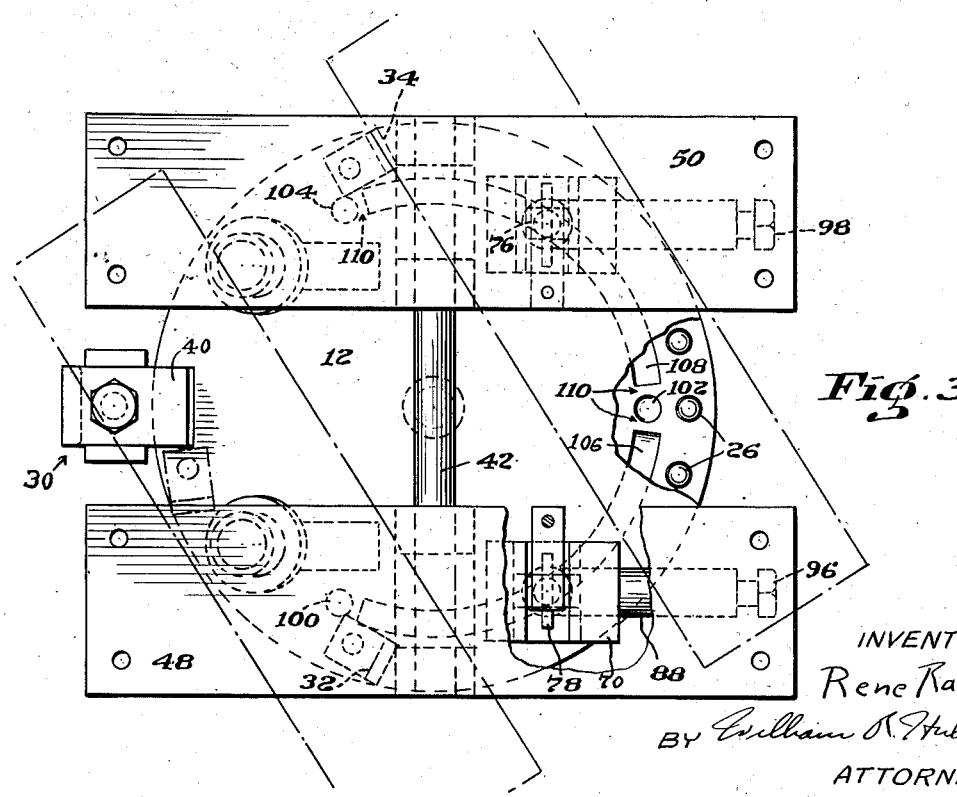
INVENTOR
Rene Ravoire
BY
ATTORNEY

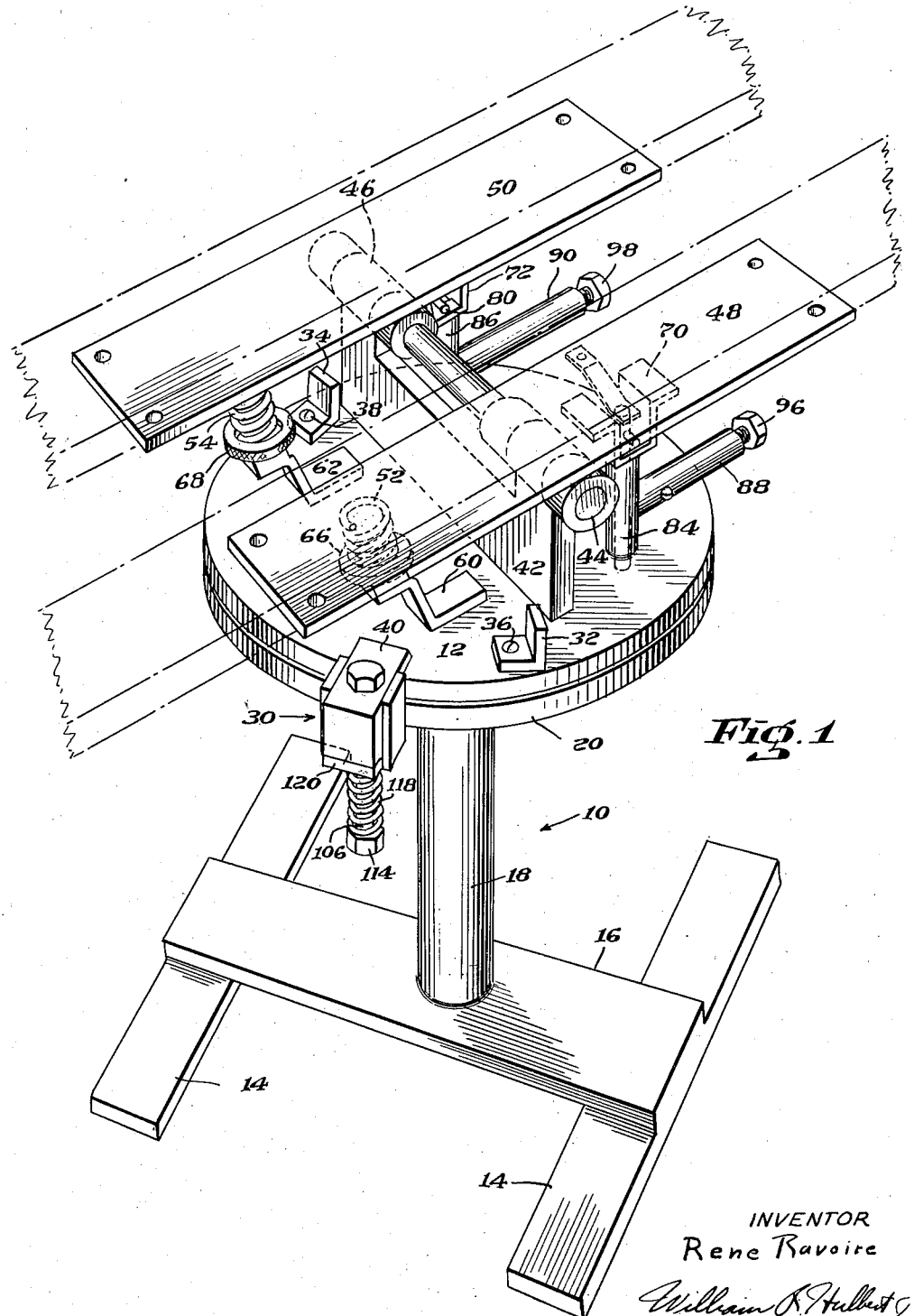

Patented Nov. 6, 1951

2,573,808

UNITED STATES PATENT OFFICE 2,573,808

APPARATUS FOR TEACHING AND PRACTICING SKIING

René Ravoire, Isere, France, assignor of fifty one-hundredths to George N. Moore, South Natick, Mass.

Application August 12, 1948, Serial No. 43,833

4 Claims. (Cl. 272—57)

This invention relates to the teaching of skiing. More particularly it is concerned with a novel apparatus for use indoors in teaching and practicing the principal turning motions of skiing according to the parallel technique.

Teaching skiing and the practice thereof on snow have numerous drawbacks. Among them is the fact that in many localities the winter season is short and skiers must often travel several hundreds of miles to find suitable ski terrain with the result that the average skier has an extremely short time to learn and to practice skiing, yet his enjoyment of the sport will be only in proportion to his proficiency.

Furthermore the beginner finds it difficult to concentrate on the proper motions when he is distracted by cold weather, the sight of more experienced skiers speeding by and the fact that the unfamiliar skis on his feet slip about in all directions on the snow, all combining to produce a mental condition not conducive to learning.

In addition, the teaching of skiing on a snowy slope is difficult because of the impossibility of breaking down the important motions of skiing into their component parts to be learned and practiced separately, as is practicable in many other sports, for example swimming. The novice skier on a slope must at the very outset perform all the motions properly or he falls. Consequently to learn to ski well on snow is usually a long, tedious, and often painful, process, and unless the pupil is fortunate enough to be able to devote a considerable amount of time to the sport over a period of weeks or months, he probably will never progress much beyond the novice class.

In the art of skiing perhaps the most important maneuver to be learned is the turn, enabling the skier to descend even the most difficult slopes without losing control. According to the parallel style of skiing the turn is performed by the use of two basic motions. The first of these is leaning forward sharply from the ankles, thus unweighting equally the heels of the skis. While the skis remain parallel and the heels thereof unweighted, the shoulders are rotated sharply in one direction or the other, the body remaining rigid, so that the shoulder motion is transmitted to the skis, driving the same around in a parallel turn. It will thus be seen that according to this style of skiing proper coordination of these two motions is essential to success.

It is accordingly an object of my invention to provide a mechanical device on which these two essential motions may be practiced, either independently or together, the machine being adaptable for use indoors where the pupil is beset by none of the mental and physical hazards that plague him on a snowy ski slope.

Another object of the invention is to provide a machine on which the important basic motions of skiing and their coordination may be taught and practiced at convenient times and places, reducing vastly the length of time and the expense necessary to learn.

Still another object of the invention is to provide a ski teaching device which will respond only if the student performs the turning motions properly.

Still another object is to provide a machine of the class described which will be completely safe in operation and subject the pupil to none of the dangers of skiing while enabling him to learn the basic motions prior to venturing out on a ski slope.

With the foregoing and other objects in view the invention is featured by the provision of a pair of parallel treadles mounted for limited rotation forwardly in two parallel vertical planes responsive to movements of the student and for rotation in a horizontal plane to simulate a turn on skis.

Likewise a feature of the invention is the provision of spring weighted latches independently holding each of said treadles in a horizontal position but adapted to be released by the sharp forward shifting of weight of the pupil whereby the treadles may be separately rotated in vertical planes and will tip downwardly and forwardly through a small angle, simulating the pitch of a ski slope.

Still another feature of the invention is the provision of means responsive to movements of the student for releasing the treadles for rotation through a limited angle in a horizontal plane only when actuated equally by the pupil.

Other objects and advantages of the invention will become apparent from the following detailed description taken in connection with the accompanying drawings in which like numerals refer to like parts in the several views and in which:

Fig. 1 is a view in perspective of the novel ski instructing machine, the manner of affixing skis thereto being indicated by dash and dot lines.

Fig. 2 is a cross sectional view of the device of Fig. 1 showing the treadle assembly rotated in a horizontal plane to a point midway of its two extreme positions.

Fig. 3 is a plan view of the device with portions broken away in the same position as Figs. 1 and 2 with the extreme swung position indicated by dash and dot lines.

Fig. 4 is a fragmentary view in section showing one of the treadle members depressed forwardly.

The machine comprises a stationary base portion 10 supporting for limited rotation in a horizontal plane a movable base plate 12. The foundation 10 comprises a pair of parallel spaced beams 14 adapted to rest on and optionally be affixed by bolts or otherwise to a flooring. Connecting the beams 14 is a transverse brace 16 from which there extends upwardly a cylindrical post 18 on which the other members are mounted. A circular immovable disc 20 is welded or otherwise firmly attached to the upper end of the post 18.

The moving portions of the machine include the disc 12 having a centrally located downwardly extending spindle 22 journalled in a vertical bore 24 in the post 18. The peripheral portions of the plate 12 rest on a series of ball bearings 26 held in depressions formed in the lower plate 20.

Affixed to the lower disc 20 by means of bolts 28 is a spring loaded brake 30 which also serves as a stop to limit rotation in a horizontal plane of the plate 12 and its associated members. Rotating with the upper disc 12 are two lugs 32 and 34 held in place by screws 36 and 38. These lugs are adapted to strike the upper plate 40 of the brake 30 limiting the total swing of the mechanism from one extreme to the other to approximately 120°.

The upper disc 12 also carries an upwardly extending rail 42 having on its upper edge hinges 44 and 46 mounting for limited rotation in parallel vertical planes the two treadles 48 and 50. The treadles 48 and 50 are adapted to receive skis as shown by the dash and dot lines of Fig. 1 or to retain any desired type of harness to accommodate the feet of a student skier who will be mounted thereon facing to the left in Fig. 2. The details of such harness form no part of the present invention and have not been shown. The harnesses should, of course, be disposed to center the pupil's weight above the central support 42.

Each of the treadles 48 and 50 is adapted to swing independently in a counter-clockwise direction as viewed in Fig. 2 to the position shown in Fig. 4. To attain this downward motion the treadles 48 and 50 rotate independently about the hinges 44 and 46 against the force of compression of coil spring 52 and 54. The coil springs 52 and 54 are held in sockets 56 underneath the toe portions of the treadles 48 and 50. The bottom of each spring is in turn adjustably supported by brackets 60 and 62 having worms 64 operable by hand wheels 66 and 68. By appropriately adjusting the hand wheels 66 and 68 the force exerted upwardly against the toe portions of the treadles by the springs 52 and 54 may be readily adjusted to meet the requirements of the individual student.

The heel portions of treadles 48 and 50 carry brackets 70 and 72 adapted to retain downwardly extending latch pins 74 and 76 which, when the treadles swing forwardly, will be raised upwardly by the toggles 78 and 80 clear of notches 100, 102 and 104. Each of the latch pins 74 and 76 carries a notch 82 and the entire pin is adapted for vertical reciprocation within housings 84 and 86 rising from the plate 12. Spring loaded latches consisting of horizontal housings 88 and 90, latch pins 92 engaging the notches 82, coil springs 94 and adjusting screws 96 and 98 provide means for holding the treadles in horizontal position until released by the student's throwing his weight onto the toe portions of the treadles.

The base plate 20 carries three notches 100, 102 and 104 to accommodate the latch pins 74 and 76 when they are in depressed condition. Arcuate grooves 106 and 108 are cut in disc 20 between the notches 100, 102 and 104 to accommodate the base portions of pins 74 and 76 during rotation of the upper table. The lips indicated generally by the numeral 110 are left between the notches 100, 102 and 104 and the ends of the grooves 106 and 108 to comprise locking surfaces which will serve to retain the upper plate in extreme position until both latches are released by the simultaneous application of equal pressure downwardly on the toe portions of the treadles 48 and 50.

The brake 30 includes a bearing surface 112 frictionally engaging the upper surface of the plate 12. The degree of braking force applied may be adjusted to meet the needs of the pupil by adjusting the nut 114 on the threaded bolt 116 against the pressure of coil spring 118 which, it will be seen, will then pull the member 40 down against plate 12, the member 40 being held resiliently in relation to the supporting bracket 120.

It can be seen from the foregoing description that the machine of my invention may be used selectively to teach either or both of the two essential motions of performing a turn according to the parallel technique of skiing. The lugs 32 and 34 may be adjusted either toward or away from the stop 40 by turning them in a horizontal plane about screws 36 and 38. When in one position they will serve to keep the upper table 12 from turning a full 120° and thus prevent the dropping of latch pins 74 and 76 into any of the notches 100, 102 and 104. In this condition plate 12 carrying the treadles can be swung to right or left without any forward depression of the treadles whereby the turning motion may be practiced independently of the forward lunge.

With the lugs 32 and 34 turned to the position shown in Fig. 1 the upper table 12 will rotate a full 120° and the latch pins 74 and 76 will lock in notches 100 and 102 in one extreme position and notches 102 and 104 in the other extreme position. Now, in order to swing the device from one position to the other, it will be necessary to release both latches simultaneously requiring the unweighting equally of the heel portions of the treadles by the student's throwing his weight evenly on the toe portions thereof against the compression of springs 52 and 54 as well as against the locking force of the springs 94 which tend to keep pins 92 in notches 82. With the machine in this condition the student may first practice independently the forward shift of weight from the ankles in order to release both latches simultaneously. Once this movement is mastered he may then follow the unlatching by a heavy swing of his shoulders in one direction or the other to complete the turn. When the plate 12 has swung a full 120°, it will automatically lock in a swung position and the student is ready to repeat the motions, turning the device in the opposite direction.

Thus I have provided a novel and mechanically foolproof and rugged device for the indoor teaching of skiing whereby a student may learn under ideal conditions the basic motions prior to venturing onto a ski slope. While I have illustrated and described a preferred embodiment of the invention, it will be understood that my invention is susceptible of modifications within the spirit and scope of the appended claims.

I claim:

1. A device for the teaching and practice of skiing which comprises, in combination, a stationary base member, a treadle-supporting member pivotally mounted thereon for limited rotation in a horizontal plane in response to movements of the pupil, a brake attached to one of said members and engaging the other of said members to control the freedom of rotation of the pivotal member, a pair of parallel treadles pivoted independently of each other to said supporting member for rotation in parallel vertical planes, and latches connecting said treadles to said treadle-supporting member to retain said treadles in horizontal position, said latches being releasable independently of each other responsive to a forward shift of the pupil's weight on said treadles, said latches including catches releasable simultaneously therewith interlocking said base and said treadle-supporting member when the latter member is swung to either of its two extreme positions.

2. A device for the teaching and practice of skiing which comprises, in combination, a stationary base member, a treadle-supporting member pivotally mounted thereon for rotation in a horizontal plane in response to movements of the pupil, a spring-loaded brake attached to one of said members and frictionally engaging the other of said members to control the freedom of rotation of the pivotally mounted member, stops on one of said members cooperating with the other member selectively limiting said rotation in both directions to predetermined angles, a pair of parallel treadles pivoted independently of each other to said supporting member for rotation in parallel vertical planes, latches connecting the heel portions of said treadles to said supporting member to retain said treadles in horizontal position, said latches being releasable independently of each other responsive to a forward shift of the pupil's weight on said treadles to permit forward pivoting of the treadles, and resilient supports mounted between said supporting member and the toe portions of said treadles, to control the rate and extent of said forward pivoting after release of said latches.

3. A device for the teaching and practice of skiing which comprises, in combination, a stationary base member, a treadle-supporting member pivotally mounted thereon for rotation in a horizontal plane in response to movements of the pupil, stops on one of said members cooperating with the other member selectively limiting said rotation in both directions to predetermined angles, a pair of parallel treadles pivoted independently of each other to said supporting member for rotation in parallel vertical planes, latches connecting the heel portions of said treadles to said supporting member to retain said treadles in horizontal position, said latches being releasable independently of each other responsive to a forward shift of the pupil's weight on said treadles, said latches including catches releasable simultaneously with said latches interlocking said base and said supporting member when the latter is swung to either of its two extreme positions, and resilient supports mounted between said supporting member and the toe portions of said treadles, to control the rate and extent of forward pivoting thereof after release of said latches.

4. A device for the teaching and practice of skiing which comprises, in combination, a stationary base member, a treadle-supporting member pivotally mounted thereon for rotation in a horizontal plane in response to movements of the pupil, a brake to control the freedom of rotation of said supporting member, stops on one of said members cooperating with the other member selectively limiting said rotation in both directions to predetermined angles, a pair of parallel treadles pivoted independently of each other to said supporting member for rotation in parallel vertical planes, latches connecting the heel portions of said treadles to said supporting member to retain said treadles in horizontal position, said latches being releasable independently of each other responsive to a forward shift of the pupil's weight on said treadles, said latches including releasable catches interlocking said base and said supporting member when the latter is swung to either of its two extreme positions, and resilient supports mounted between said supporting member and the toe portions of said treadles, to control the rate and extent of forward pivoting thereof after release of said latches.

RENÉ RAVOIRE.

REFERENCES CITED

The following references are of record in the file of this patent:

UNITED STATES PATENTS

| Number | Name | Date |
| --- | --- | --- |
| 2,274,081 | Mautin | Feb. 24, 1942 |
| 2,455,274 | Scriver | Nov. 30, 1948 |